(12) United States Patent
Hoshina et al.

(10) Patent No.: US 6,351,720 B1
(45) Date of Patent: Feb. 26, 2002

(54) TROLLEY CAMERA POSITION DETECTING APPARATUS

(75) Inventors: Hiromitsu Hoshina; Toshiyuki Fujii, both of Hiroshima (JP)

(73) Assignee: Mitsubishi Heavy Industries, Ltd. (JP)

(*) Notice: Subject to any disclaimer, the term of this patent is extended or adjusted under 35 U.S.C. 154(b) by 0 days.

(21) Appl. No.: 09/259,843

(22) Filed: Feb. 26, 1999

Related U.S. Application Data

(63) Continuation-in-part of application No. 08/957,297, filed on Oct. 24, 1997.

(51) Int. Cl.[7] .......................... G01C 9/00; G01C 17/00; G01C 19/00
(52) U.S. Cl. ..................... 702/154; 356/139.1
(58) Field of Search .......................... 702/154, 33, 36, 702/40, 127, 150–153, 183; 212/272, 275–277; 396/419, 428; 352/243; 356/139.1

(56) References Cited

U.S. PATENT DOCUMENTS

| | | | | |
|---|---|---|---|---|
| 3,881,608 A | * | 5/1975 | Hupkes | 214/14 |
| 5,089,972 A | * | 2/1992 | Nachman et al. | 700/108 |
| 5,819,962 A | * | 10/1998 | Okubo et al. | 212/275 |
| 6,135,301 A | * | 10/2000 | Monzen et al. | 212/275 |
| 6,182,844 B1 | * | 2/2001 | Monzen et al. | 212/274 |

FOREIGN PATENT DOCUMENTS

WO        WO 96/13455        5/1996

* cited by examiner

Primary Examiner—Marc S. Hoff
Assistant Examiner—Demetrius R. Pretlow
(74) Attorney, Agent, or Firm—Trop, Pruner & Hu, P.C.

(57) ABSTRACT

A trolley camera position detecting apparatus of the present invention is configured so that a girder camera is installed on a girder, a clinometer is installed to the girder camera, a constant value $\delta_o$ relating to a horizontal travel amount $\delta_g$ of a girder reference point is measured in advance by using the output values $\delta_{cg}$ and $\delta_{kg}$, and on the other hand, the horizontal travel amount $\delta_g$ is calculated by using the output values $\theta_{cg}$ and $\delta_{kg}$ of the girder camera and clinometer, which are measured every moment, and the constant value $\delta_o$, and the position of a trolley camera with the rail center being a reference is corrected by using the horizontal travel amount $\delta_g$.

1 Claim, 4 Drawing Sheets

TROLLEY CAMERA POSITION DETECTING APPARATUS

This is a continuation-in-part of prior application Ser. No. 08/957,297 filed Oct. 24, 1997.

FIELD OF THE INVENTION AND RELATED ART STATEMENT

The present invention relates to a position detecting apparatus for a trolley camera on a trolley for a container crane, for example, and can be applied to all machines for carrying a cargo lifted by a wire rope, such as a transfer crane, overhead crane, and the like.

Conventionally, a container crane etc. are used when cargoes piled on the ground are loaded on a ship alongside a pier or cargoes on a ship are unloaded and piled on the ground. In such cargo handling work, the cargo is controlled so that the swing of cargo is decreased, and the lifted cargo is landed accurately at a target position by using a landing control device, described later.

With the conventional landing control device, a cargo is hung with a lifting wire via a hoisting accessory, the crane is run to the target position along the rails in this state, the trolley is moved to the target position along the girder, the swing amount of lifted cargo is subsequently detected by a sensor (the swing amount is detected as an inclination angle with respect to the vertical line by photographing a target on the hoisting accessory with a camera installed on the trolley), and the movement of the trolley is controlled based on this detection value, by which the swing of lifted cargo is made as small as possible, and the lifted cargo is landed at the time when the swing amount becomes within an allowable value.

For the above-mentioned landing control device for hoisting accessory, the trolley on the girder is first stopped correctly at a predetermined position, the swing amount of the hoisting accessory is then detected by a swing sensor, and swing stopping control is carried out based on this detection value, by which the cargo is landed at the target position. The position of the trolley camera on the trolley at this time is successively detected by detecting the travel amount from the reference point provided on the girder by using an encoder (not shown).

However, if the deflection of the support leg or girder is changed, or a shift occurs between the crane wheel and the rail because of the movement of trolley on the girder or the change of the weight of lifted cargo, a shift of reference point on the girder is produced by the resultant horizontal travel amount, which produces a measurement error, so that the detection accuracy of the trolley position or trolley camera position is worsened. As a result, the landing accuracy is also decreased.

OBJECT AND SUMMARY OF THE INVENTION

The present invention was made in view of such a situation, and accordingly an object thereof is to provide a trolley camera position detecting apparatus in which the position of a hoisting accessory is detected accurately, whereby the accuracy of landing position control can be increased.

To solve the problem with the above-described prior art, the present invention provides a trolley camera position detecting apparatus configured so that a trolley camera is installed on a trolley travelling on a girder, a leg target which runs together with a crane is provided at a position a predetermined distance apart from the center of a rail on which the crane runs, a girder camera is installed on the girder at a position a predetermined distance apart in the same way, an inclination angle $\theta_{cg}$ between the camera centerline and the leg target is measured by the girder camera, a clinometer is installed to the girder camera to measure an inclination angle $\theta_{kg}$ of the clinometer with respect to the vertical line, a horizontal travel amount $\delta_g$ of a reference point on the girder with respect to the rail center is measured by a measuring instrument, a constant value $\delta_o$ relating to the horizontal travel amount is calculated as $$\delta_o = \delta_{go} - H_g(\theta_{cgo} - \theta_{kgo})$$

(where, $H_g$ is a height from the leg target to the girder camera)
in advance by using the initial values $\theta_{cgo}$, $\theta_{kgo}$, and $\delta_{go}$ of the measured values, and on the other hand, the inclination angles $\theta_{cg}$ and $\theta_{kg}$ are measured every moment during cargo handling operation, a changing horizontal travel amount $\delta_g$ from the reference point on the girder is calculated as $$\delta_g = \delta_o + H_g(\theta_{cg} - \theta_{kg})$$

by using these measured values $\theta_{cg}$ and $\theta_{kg}$ and the constant value $\delta_o$, and the position of the trolley camera with the rail center being a reference is corrected by using the horizontal travel amount $\delta_g$.

With the trolley camera position detecting apparatus in accordance with the present invention, the inclination angle $\theta_{cg}$ between the camera centerline and the leg target at the lower part of a leg is measured by the girder camera, the inclination angle $\theta_{kg}$ of the clinometer with respect to the vertical line is measured by the clinometer on the girder, the horizontal travel amount $\delta_g$ due to the inclination of crane leg on the rails is measured by a transit (measuring instrument) etc., the constant value relating to the horizontal travel amount $\delta_o = \delta_{go} - H_g(\theta_{cgo} - \theta_{kgo})$ is calculated by using the initial values, the inclination angles $\theta_{cg}$ and $\theta_{kg}$ are measured every moment during cargo handling operation (during control), the horizontal travel amount of the reference point on the girder $\delta_g = \delta_o + H_g(\theta_{cg}\theta_{kg})$ is calculated by using these measured values $\theta_{cg}$ and $\theta_{kg}$ and the constant value $\delta_o$, and the position (distance) $\delta$ is corrected by using $\delta_g$ thus calculated.

As described above, the trolley camera position detecting apparatus in accordance with the present invention is configured so that the girder camera is installed to the girder, the clinometer is installed to the girder camera, the constant value relating to the horizontal travel amount of girder reference point is calculated in advance by using the output values thereof, and on the other hand, the horizontal travel amount is calculated by using the output values of the girder camera and clinometer measured every moment and the constant value, and the position of the trolley camera with the rail center being the reference is corrected by using this horizontal travel amount. Therefore, the position of hoisting accessory can be detected accurately, whereby the accuracy of landing position control of hoisting accessory can be increased.

DETAILED DESCRIPTION OF PREFERRED EMBODIMENTS

Figure 1:
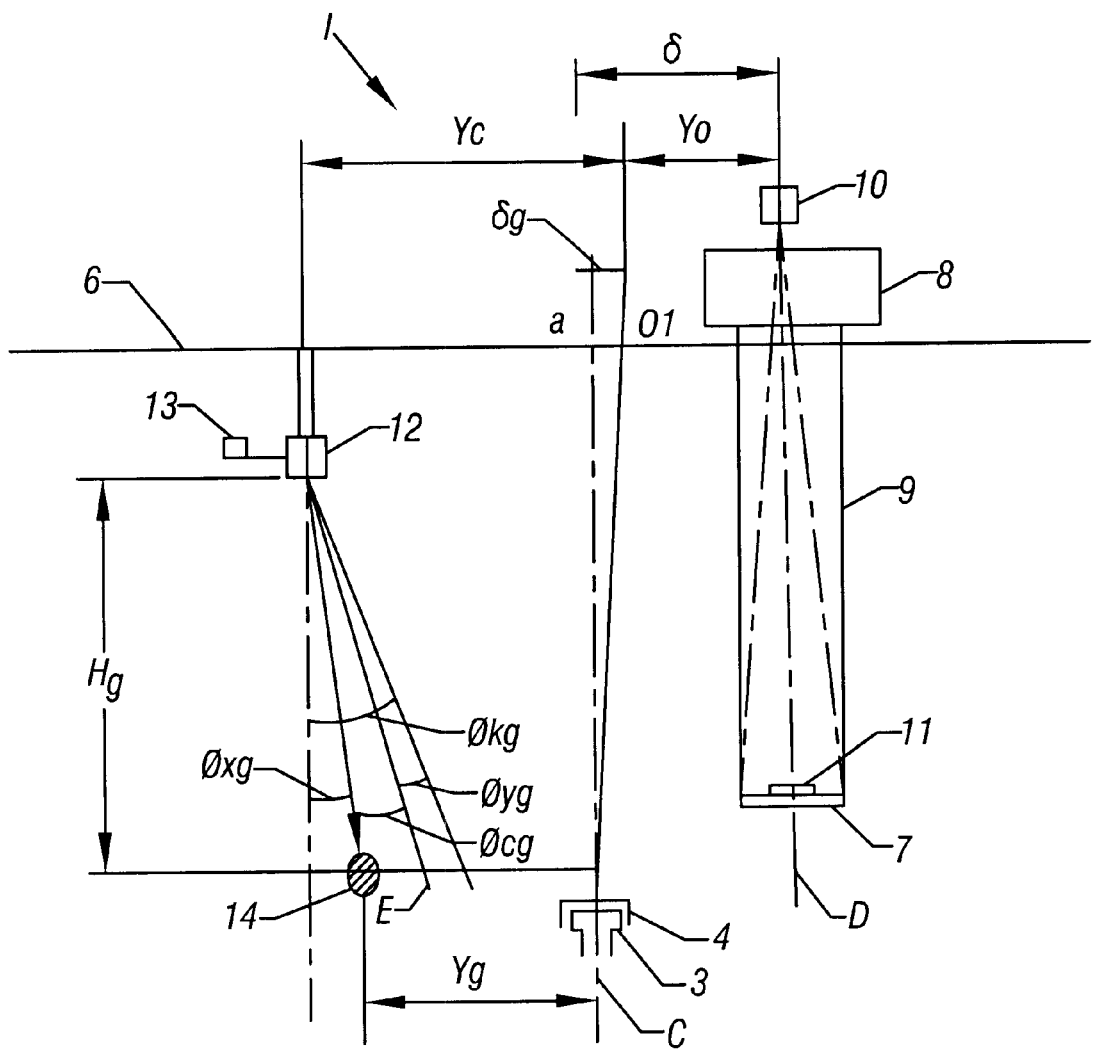
FIG. 1 is a schematic view of a trolley camera position detecting apparatus in accordance with one embodiment of the present invention.

The present invention will be described in detail in accordance with an embodiment shown in the drawings.

FIGS. 1 to 4 show one embodiment of a trolley camera position detecting apparatus in accordance with the present invention. The trolley camera position detecting apparatus of this embodiment is used for a container crane 1 shown in FIG. 2.

Figure 2:
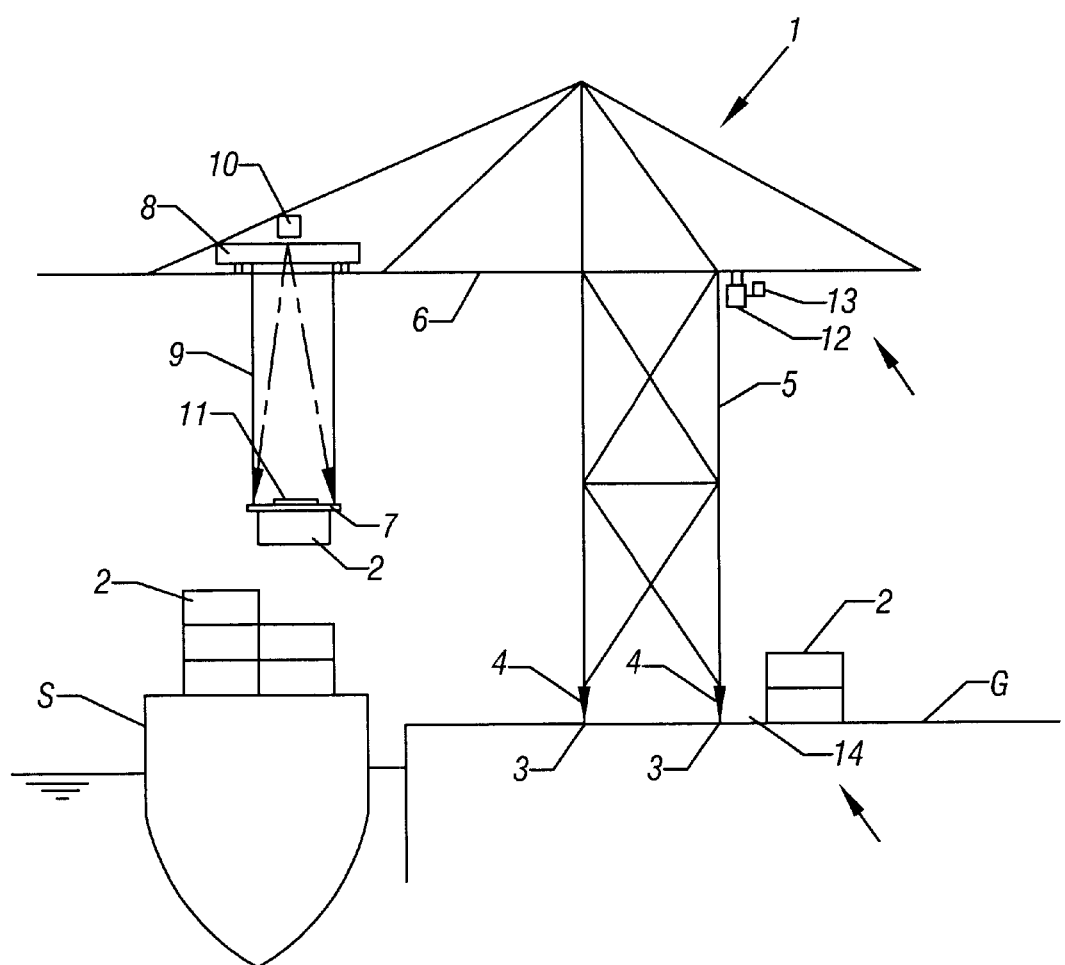
FIG. 2 is a schematic view showing the whole of a container crane equipped with the trolley camera position detecting apparatus of this embodiment.

As shown in FIGS. 1 and 2, the container crane 1, which is a machine for loading cargoes (containers) 2 piled on the ground G onto a ship S alongside a pier or unloading cargoes 2 on the ship S onto the ground G, has a support leg 5 which is erected so as to be capable of running on a pair of rails 3 laid on the ground G via wheels 4, a girder 6 which is provided on top of the support leg 5 and extends horizontally perpendicular to the support leg 5, and a trolley 8 which is installed on the girder 6 so as to move while hanging a hoisting accessory 7.

With such a container crane 1, a cargo 2 is hoisted by the hoisting wire 9 fixed to trolley 8 through the hoisting accessory 7, and in this state the trolley 8 is moved along the girder 6 or the support leg 5 is run along the rails 3 by driving the wheels 4 at the lower part of the support leg 5. Thereby, the lifted cargo 2 is carried to a predetermined position and landed at that position for loading/unloading.

On the other hand, a trolley camera 10 for measuring the swing amount of the hoisting accessory 7 is provided above the trolley 8 of the container crane 1 as shown in FIGS. 1 and 2. This trolley camera 10 is used for photographing a target 11 provided on the upper surface of the hoisting accessory 7 and detecting the swing amount by processing the image. When this detected value is sent to an arithmetic unit (not shown), a manipulated variable is calculated by the arithmetic unit, and the trolley 8 is controlled by the resultant manipulated variable, whereby the cargo 2 is landed after the swing of the cargo 2 is decreased.

The position of the trolley 8 on the girder 6 or the position of the trolley camera 10 is detected by an encoder (not shown) by taking a distance from a reference point $O_1$ set on the girder 6 to a camera centerline D as a horizontal travel amount $Y_o$. In the present invention, the position (distance) of the trolley camera 10 is corrected by detecting a horizontal travel amount $\delta_g$ of the reference point $O_1$ with a rail center C being a reference, which is caused by a change of the inclination of the support leg 5, a shift between the rail 3 and the wheel 4, and the like.

Also, a girder camera 12 for photographing a later-described leg target is installed so as to depend from the girder 6. This girder camera 12 is located at a position $Y_c$ distant from the reference point $O_1$. At the side of the girder camera 12, a clinometer 13 for measuring the inclination angle protrudes horizontally. At the lower part of the support leg 5 located under the girder camera 12 by a height $H_g$, a leg target (for example, a laser target) 14 protruding horizontally is provided. This leg target 14 is located at a position $Y_g$ distant from the rail center C.

The symbols in FIG. 1 denote the following:

$Y_o$: distance from the reference point on the girder to the trolley camera centerline $Y_g$: distance from the rail center to the leg target $Y_c$: distance from the rail center to the girder camera a: intersection point of the vertical line passing through the rail center and the girder $\delta_g$: horizontal travel amount from the rail center to the reference point on the girder $H_g$: height from the leg target to the girder camera θkg: clinometer output value (rad) of the girder camera $\theta_{cg}$: output value (rad) of the girder camera θxg: $(\theta_{kg}-\theta_{cg})-\theta_{yg}$(rad)

Figure 3:
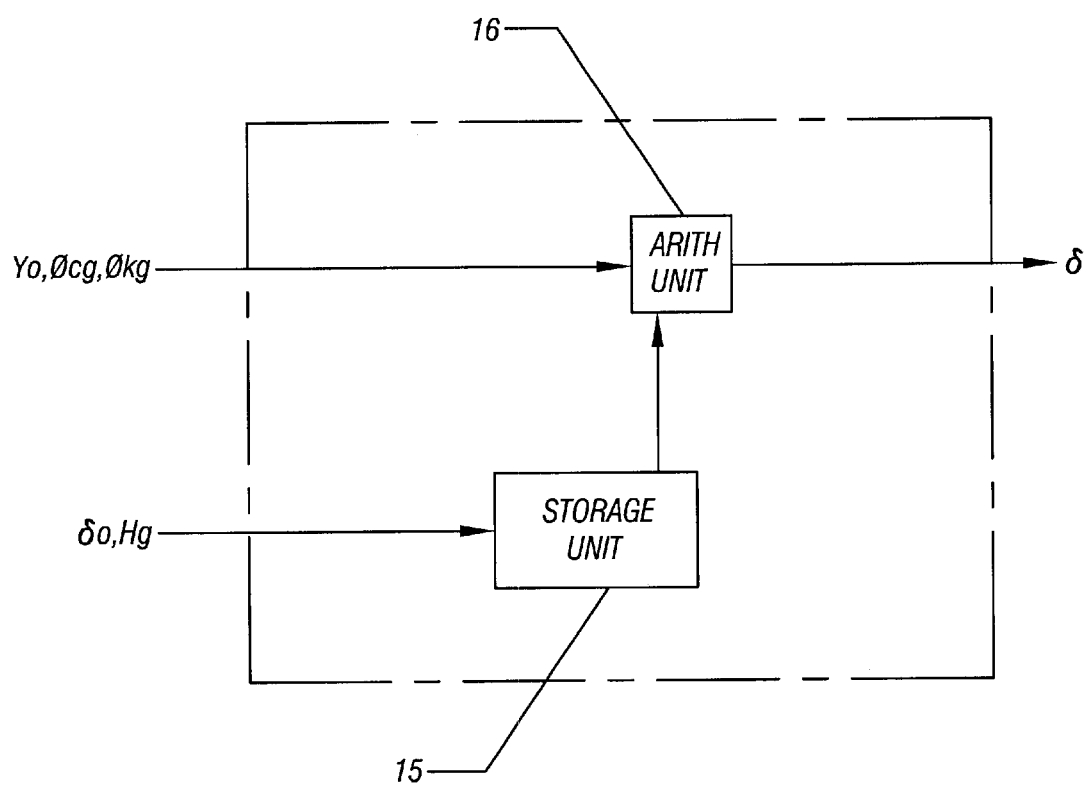
FIG. 3 is a schematic view showing a storage unit and an arithmetic unit provided in relation to the trolley camera position detecting apparatus of this embodiment.

$\theta_{yg}$: angular difference (rad) between the girder camera centerline and the clinometer δ: true trolley camera distance A constant value $\delta_o$ and the measured value of height $H_g$ are sent and stored in a storage unit 15 and then sent to an arithmetic unit 16 as shown in FIG. 3. Also, the measured value of distance $Y_o$ and the output values $\theta_{cg}$ and $\theta_{kg}$ are sent to the arithmetic unit 16. The true distance 6 of the trolley camera 10 is calculated based on these values sent to the arithmetic unit 16.

Figure 4:
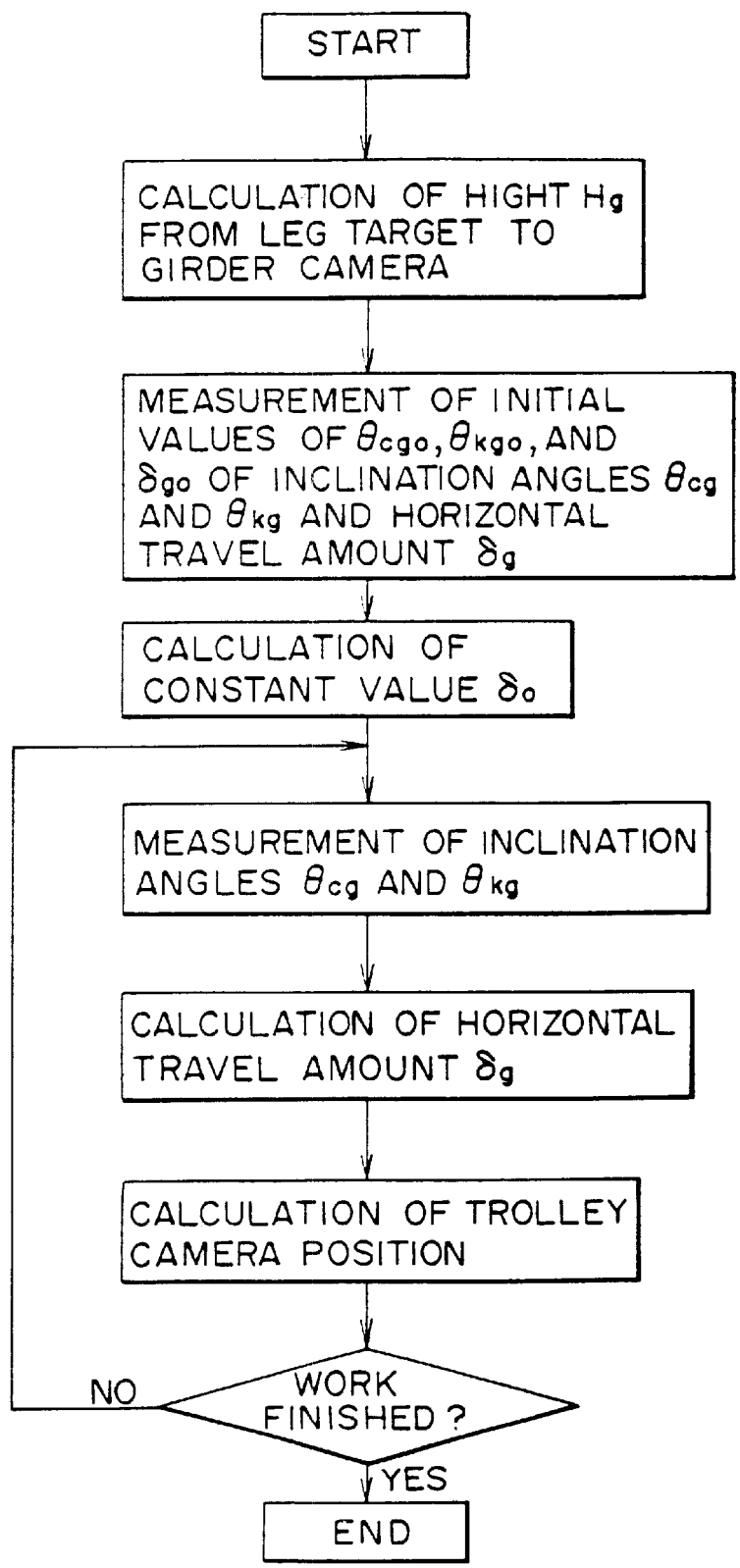
FIG. 4 is a flowchart showing a work procedure for detecting the position of trolley camera of this embodiment.

For the trolley camera position detecting apparatus of this embodiment, the true position (distance) δ of the trolley camera 10 is detected by the work procedure shown in FIG. 4.

First, the inclination angle $\theta_{cg}$ between the camera centerline E and the leg target 14 is measured, and the inclination angle (installation angle) $\theta_{kg}$ with respect to the vertical line is measured by using the clinometer 13.

In FIG. 1, $$H_g\theta_{xg}=Y_c-Y_g-\delta_g \quad (1)$$

$$\theta_{xg}=(\theta_{kg}-\theta_{cg})-\theta_{yg} \quad (2)$$

Multiplying both sides of Eq. (2) by $H_g$, $$H_g\theta_{xg}=H_g(\theta_{kg}-\theta_{cg})-H_g\theta_{yg} \quad (3)$$

From Eqs. (1) and (3), $$\delta_g=H_g(\theta_{cg}-\theta_{kg})+H_g\theta_{yg}-Y_g+Y_c \quad (4)$$

Here, $\theta_{yg}$ is constant because it is the angular difference between the camera centerline E of the girder camera 12 and the inclination angle of the clinometer 13, $Y_g$ is constant because it is the distance between the rail center C of the rail 3 and the leg target 14, and $Y_c$ is also constant because it is the distance between the reference point $O_1$ and the camera centerline E of the girder camera 12.

Therefore, Eq. (4) indicates that the horizontal travel amount $\delta_g$ can be calculated by the output $\theta_{cg}$ of the girder camera 12 and the output $\theta_{kg}$ of the clinometer 13.

If the amount (constant value: $H_g\theta_{yg}-Y_g+Y_c$) independent of the change of horizontal travel amount is taken as $\delta_o$, the horizontal travel amount can be expressed as $$\delta_g=\delta_o+H_g(\theta_{cg}-\theta_{kg}) \quad (5)$$

Thus, by substituting the respective initial values $\theta_{cgo}$, $\theta_{kgo}$, and $\delta_{go}$ of the aforesaid $\theta_{cg}$, $\theta_{kg}$, and $\delta_g$ measured under the same lifted cargo condition into Eq. (5), the constant value $\delta_o$ can be calculated as $$\delta_o=\delta_{go}-H_g(\theta_{cgo}-\theta_{kgo}) \quad (6)$$

Thereupon, the output $\theta_{cg}$ of the girder camera 12 and the output $\theta_{kg}$ of the clinometer 13 are measured every moment during cargo handling operation (during control), the horizontal travel amount $\delta_g$ of the reference point $O_1$ is successively calculated by substituting these measured values and the initial value $\delta_o$ into Eq. (5), the true distance $\delta$ ($\delta = Y_o + \delta_g$) of the trolley camera 10 is calculated by the arithmetic unit 16 using the calculated value $\delta_g$ and the distance $Y_o$, and the position of the trolley camera 10 is corrected. If the position is corrected in such a manner, the accuracy of the landing position control of the hoisting accessory 7 can be enhanced.

The above is a description of one embodiment of the present invention. The present invention is not limited to the above-described embodiment, and various modifications and changes can be made on the basis of the technical concept of the present invention.

For example, the initial value $\delta_{go}$ of the horizontal travel amount of the reference point on the girder with respect to the rail center C in the above-described embodiment can be measured by measuring means such as a transit provided in the vicinity of the base of the support leg 5. Also, if the angular difference $\theta_{yg}$ between the camera and the clinometer can be measured by some method, the constant value $\delta_o$ can be determined directly together with other measured distances $H_g$, $Y_g$, and $Y_c$.

What is claimed is:

1. A trolley camera position detecting apparatus characterized by a crane comprising a trolley moving on a girder, a trolley camera mounted at the trolley, a leg supporting the girder and wheels for allowing the crane to travel on a rail, wherein a leg target is provided to travel together with the crane in a position away from a center of the rail by a predetermined distance, a girder camera is mounted on said girder, the girder camera provided with a clinometer to thereby allow measuring an inclination $\theta_{cg}$ between a camera centerline and said leg target using the girder camera and measuring an inclination $\theta_{kg}$ using the clinometer, an initial value $\delta go$ of a horizontal travel amount $\delta g$ of a girder reference point in relation to the center of the rail is measured in advance using an instrumentation, and a constant value $\delta o$ in regard of the horizontal travel amount is calculated using initial values $\theta_{cg}$ and $\theta kgo$ of the inclinations $\theta cg$ and $\theta kg$, respectively at a time of measuring the initial value of $\theta go$ as indicated by $$\delta o = \delta go - Hg(\theta cgo - \theta kgo)$$

where Hg is a height from the leg target to the girder camera, said inclinations $\theta cg$ and $\theta kg$ are calculated in time sequence during loading, a change of the horizontal travel amount $\delta g$ from said reference point on said girder is calculated using the obtained $\theta cg$, $\theta kg$ and the constant value $\delta o$ as indicated by $$\delta g = \delta o - Hg(\theta cg - \theta kg),$$

a position of said trolley camera with reference to the center of the rail using the horizontal travel amount $\delta g$, and structural elements are provided for carrying out the mathematical expressions for calculating the constant value $\delta o$ in regard of the horizontal travel amount and the horizontal travel amount $\delta g$.

* * * * *